(12) United States Patent
Lamgaday et al.

(10) Patent No.: US 9,205,712 B2
(45) Date of Patent: Dec. 8, 2015

(54) SNAP-IN INLET AND CONNECTION METHOD FOR AIR MAINTENANCE TIRE

(71) Applicant: The Goodyear Tire & Rubber Company, Akron, OH (US)

(72) Inventors: Robin Lamgaday, Norton, OH (US); Cheng-Hsiung Lin, Hudson, OH (US); Thulasiram Gobinath, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 241 days.

(21) Appl. No.: 14/106,904

(22) Filed: Dec. 16, 2013

(65) Prior Publication Data

US 2015/0165836 A1 Jun. 18, 2015

(51) Int. Cl.
*B60C 23/10* (2006.01)
*B60C 23/12* (2006.01)
*B60C 29/04* (2006.01)

(52) U.S. Cl.
CPC ............ *B60C 23/12* (2013.01); *B60C 29/04* (2013.01); *Y10T 29/49538* (2015.01); *Y10T 152/10495* (2015.01)

(58) Field of Classification Search
CPC .......... B60C 23/10; B60C 23/12; B60C 29/04
USPC ............................. 152/419, 423, 424, 425, 426
See application file for complete search history.

(56) References Cited

U.S. PATENT DOCUMENTS

| | | | |
|---|---|---|---|
| 1,050,886 A | 1/1913 | Wetherell | |
| 1,134,361 A | 4/1915 | Wetherell | |
| 3,304,981 A | 2/1967 | Sheppard | ....................... 152/426 |
| 3,833,041 A | 9/1974 | Glad et al. | ...................... 152/347 |
| 3,867,973 A | 2/1975 | Cozzolino et al. | ............ 152/153 |

(Continued)

FOREIGN PATENT DOCUMENTS

| | | | |
|---|---|---|---|
| DE | 3433318 | 3/1986 | ............. B60C 23/12 |
| EP | 2338703 | 6/2011 | ............. B60C 23/00 |
| EP | 2455240 A2 | 5/2012 | |

(Continued)

OTHER PUBLICATIONS

EPO search report received Jul. 7, 2015.

*Primary Examiner* — John Walters
*Assistant Examiner* — James Triggs
(74) *Attorney, Agent, or Firm* — Richard B. O'Planick

(57) ABSTRACT

An air maintenance tire includes an air inlet housing affixed to the inner liner of a tire. An elongate sidewall air pumping passageway is incorporated within a first tire sidewall. An intake conduit and an elongate tubular inlet conduit are provided having a quick connect/disconnect latching attachment to sockets formed by the air inlet housing.

13 Claims, 11 Drawing Sheets

(56) References Cited

U.S. PATENT DOCUMENTS

| | | | |
|---|---|---|---|
| 4,922,984 A | 5/1990 | Dosjoub et al. | 152/415 |
| 5,052,456 A | 10/1991 | Dosjoub | 152/415 |
| 7,117,731 B2 | 10/2006 | Hrabal | 73/146 |
| 7,225,845 B2 | 6/2007 | Ellmann | 152/426 |
| 7,314,072 B2 * | 1/2008 | Bunker | B60C 23/12 152/415 |
| 8,042,586 B2 | 10/2011 | Losey et al. | 152/426 |
| 8,113,254 B2 | 2/2012 | Benedict | 152/426 |
| 8,381,785 B2 * | 2/2013 | Losey | B60C 23/12 152/415 |
| 8,534,335 B2 * | 9/2013 | Benedict | B60C 23/12 152/419 |
| 8,550,137 B2 * | 10/2013 | Delgado | B60C 23/12 152/418 |
| 8,573,270 B2 * | 11/2013 | Hinque | B60C 23/12 152/419 |
| 8,695,661 B2 * | 4/2014 | Delgado | B60C 23/12 152/415 |
| 8,915,277 B2 * | 12/2014 | Hinque | B60C 23/12 152/415 |
| 2009/0294006 A1 | 12/2009 | Hrabal | 152/426 |

FOREIGN PATENT DOCUMENTS

| | | | |
|---|---|---|---|
| EP | 2578420 | 4/2013 | B60C 23/12 |
| EP | 2740616 A1 | 6/2014 | |
| EP | 2883721 A1 | 6/2015 | |
| RU | 2106978 | 3/1998 | B60C 23/12 |
| WO | 03/049958 | 6/2003 | B60C 23/12 |
| WO | 2005/012009 | 2/2005 | B60C 23/00 |
| WO | 2007/134556 | 11/2007 | B60C 23/00 |
| WO | 2010/008338 | 1/2010 | B60C 23/12 |

* cited by examiner

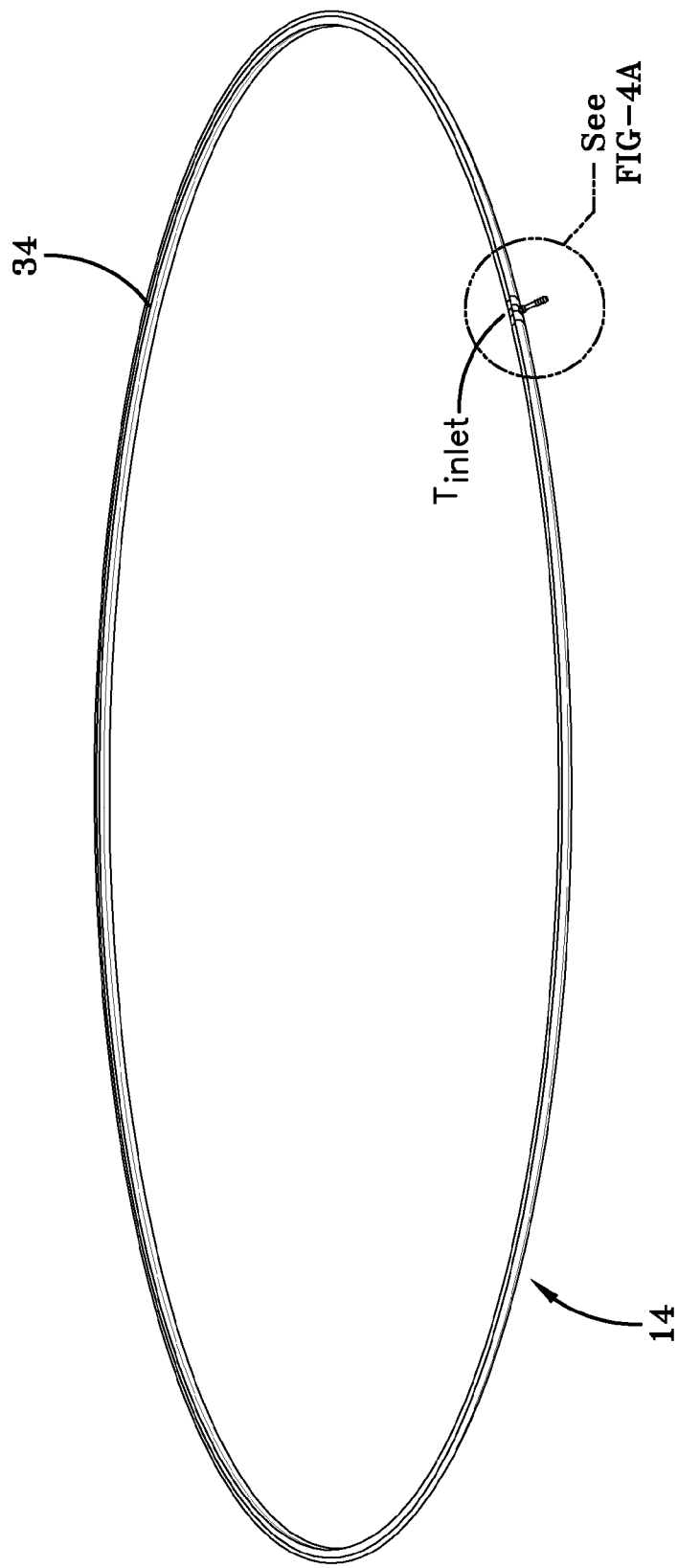

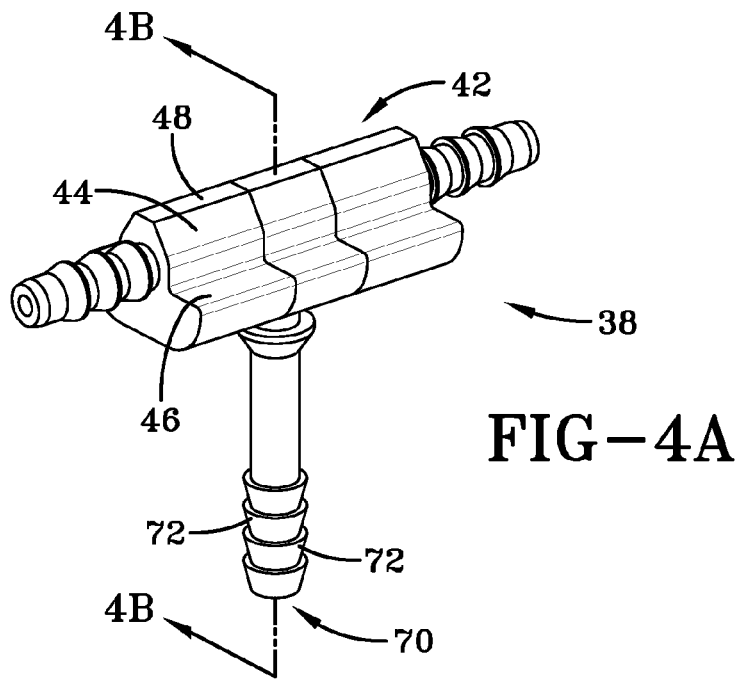
FIG-4A
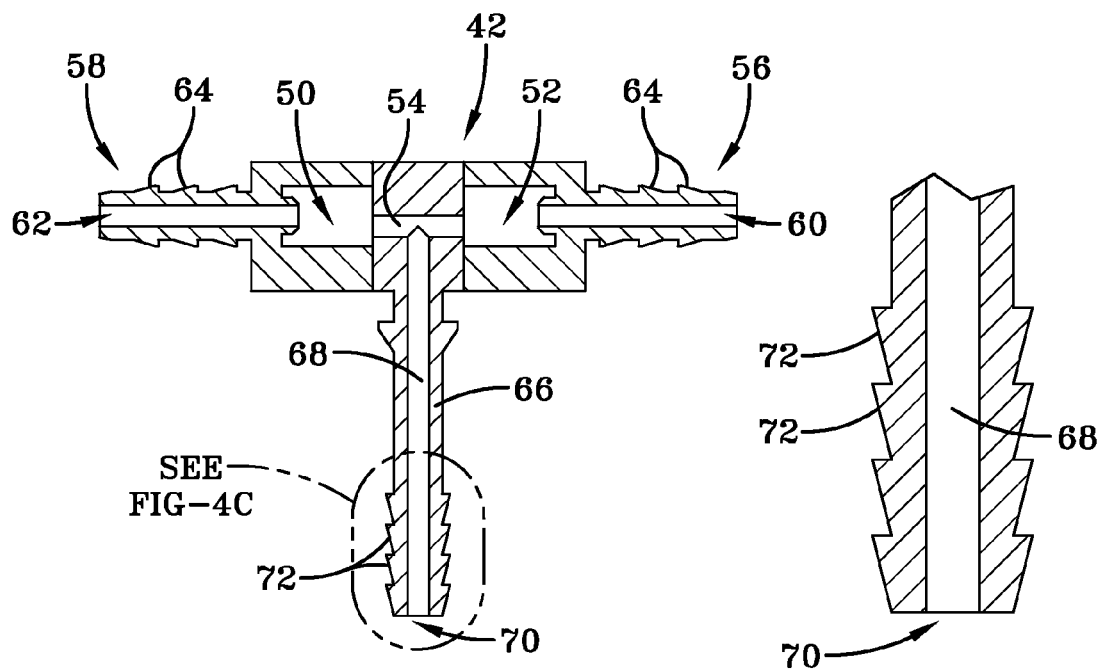
FIG-4B
FIG-4C

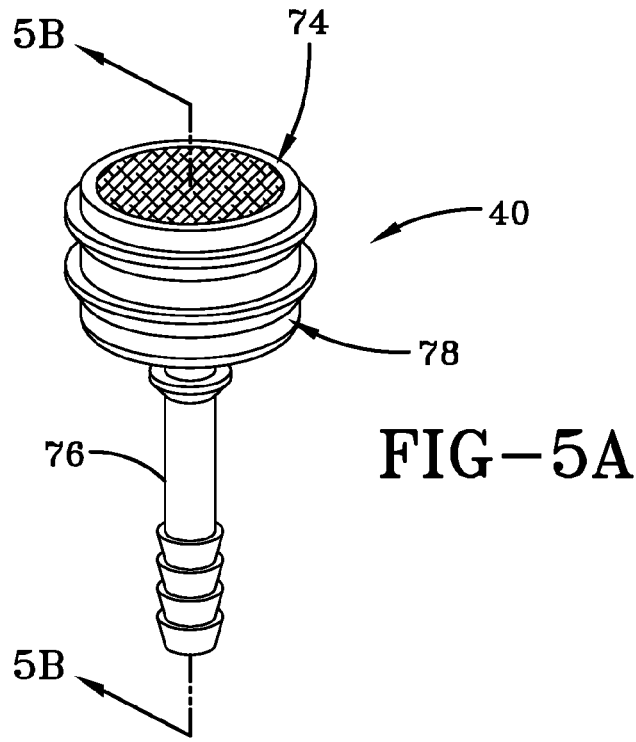
FIG-5A
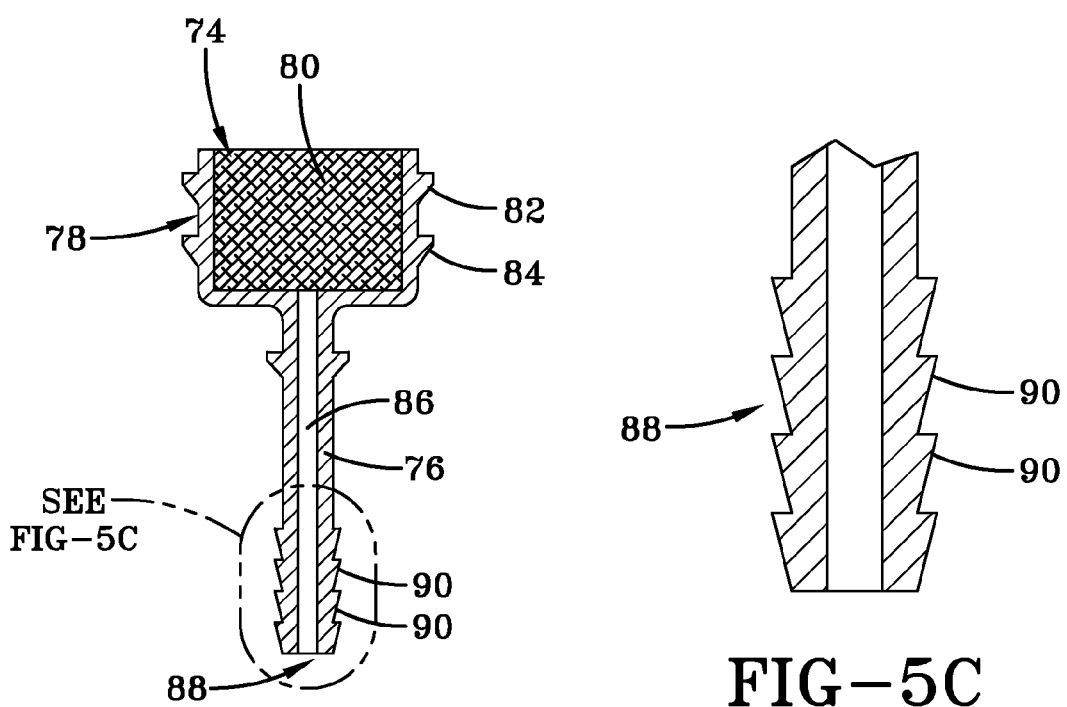
FIG-5B
FIG-5C

SNAP-IN INLET AND CONNECTION METHOD FOR AIR MAINTENANCE TIRE

FIELD OF THE INVENTION

The invention relates generally to air maintenance tires and, more specifically, to such tires having a sidewall-located tubular pump mechanism and an air inlet assembly attaching to a tire mounted inlet housing.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance pumping system within a tire that will maintain tire air pressure to compensate for any reduction in tire pressure over time without the need for driver intervention.

SUMMARY OF THE INVENTION

In one aspect of the invention, an air maintenance tire includes an air inlet housing affixed to the inner liner of a tire. An elongate sidewall air passageway is incorporated within a first tire sidewall, operatively located to compress segment by segment from an expanded diameter to a substantially reduced diameter responsive to a bending strain introduced into the first sidewall from a rolling tire footprint; whereby forcing air segment by segment along the sidewall air passageway. An elongate tubular inlet conduit is provided to route air from the inlet housing to the sidewall air passageway. An intake conduit is provided to route air from outside of the tire through the first tire sidewall, to the tire inner liner and into the inlet housing. The inlet conduit and the intake conduit attach to and detach from respective first and second elongate sockets formed by the inlet housing. The inlet conduit and intake conduit have snap-in spaced apart annular ribs that mate with respective annular detents within the first and second sockets to facilitate a quick connect/disconnect of the inlet conduit and the intake conduit from respective inlet housing sockets.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 3 is a perspective view of tube with inlet and outlet connectors.

FIG. 4A is a perspective view of connector housing from FIG. 3.

FIG. 4B is a section view of connector housing from FIG. 4A.

FIG. 4C is an enlarged view of inlet conduit area from FIG. 4B.

FIG. 5A is a perspective view of filter and intake conduit.

FIG. 5B is a section view of filter and intake conduit from FIG. 6A.

FIG. 5C is an enlarged view of intake conduit area from FIG. 5B.

DETAILED DESCRIPTION OF THE INVENTION

Figure 1:
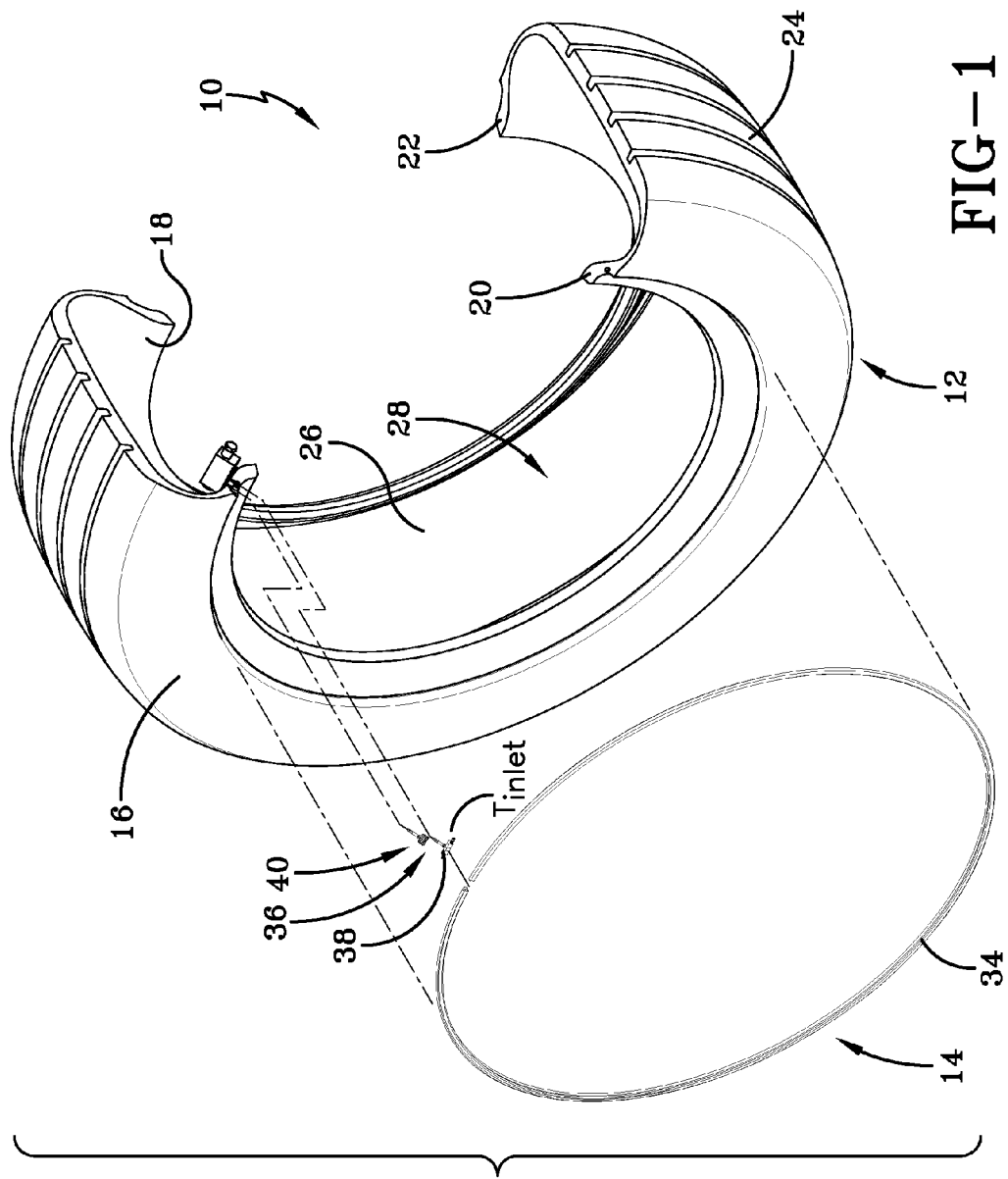
FIG. 1 is a quarter section exploded perspective view of a tire showing the inlet, filter, outlet and tube of a two 180 degree (reversible) peristaltic air pump system.
Figure 2:
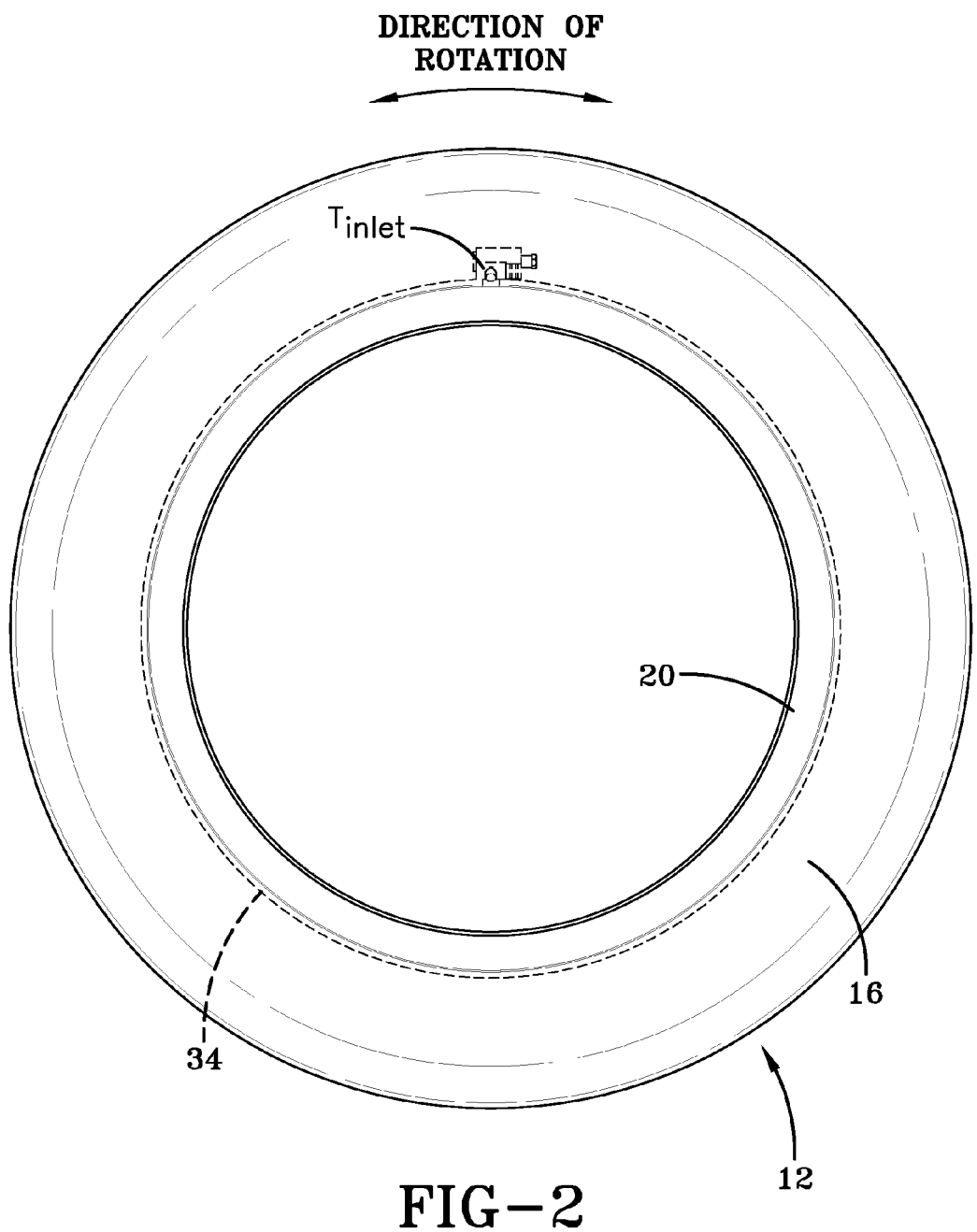
FIG. 2 is a side view of tire showing inlet, outlet and tube locations.

Referring to FIGS. 1 through 3, a tire assembly 10 includes a tire 12, and a tire-based peristaltic pump assembly 14. The tire 12 mounts in conventional fashion to a rim (not shown) for vehicle use. The tire is of conventional construction, having a pair of sidewalls 16, 18 extending from opposite bead areas 20, 22 to a crown or tire read region 24. The tire and rim enclose a tire cavity 28 that is defined by a tire inner liner 26.

As seen from FIGS. 1 through 3, the peristaltic pump assembly 14 includes an annular air tube 34 that encloses an annular air passageway 32. The tube 34 is formed of a resilient, flexible material such as plastic or rubber compounds that is capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly.

The operational principle of the peristaltic pumping tube in a tire for the purpose of maintaining tire air pressure is described in issued U.S. Pat. No. 8,113,254 B2, hereby incorporated herein by reference in its entirety. As disclosed, a peristaltic pumping tube is incorporate within a tire sidewall. As disclosed by the above patent incorporated by reference herein, a T-shaped inlet device is affixed inline with an annular pumping tube and conducts air from outside the tire into the pumping tube for pressurization. A T-shaped outlet device, positioned opposite the inlet device, is likewise affixed inline with the pumping tube. The outlet device conducts pressurized air from the pumping tube into the tire cavity to maintain cavity pressure at a desired level. Functionally, the pumping tube is located in a high flex region of the sidewall. So located, the pumping tube compresses segment by segment from an expanded diameter to a substantially reduced diameter responsive to a bending strain introduced into the sidewall from a rolling tire footprint. Pressurized air is thereby forced segment by segment along the air tube and directed as needed into the tire cavity for pressure maintenance.

While working well, the inlet and outlet devices taught by U.S. Pat. No. 8,113,254 are relatively large and their incorporation into and occupancy within a tire sidewall introduces structural disruption in the sidewall. Moreover, the inlet and outlet devices are difficult to access and repair should that become necessary. Finally, the inlet and outlet devices of the patent are not easily affixed to the pump air tube and replacing such devices within a tire sidewall could prove problematic.

The peristaltic pump assembly 14 of the subject invention provides a snap-in inlet attachment system for connecting components together. Air from outside the tire is routed by the intake assembly into the tire cavity, and then from the tire cavity into a peristaltic, sidewall based, pumping tube 34. The pumping tube 34 resides within a groove 30 formed within a tire sidewall 16. The invention as seen in FIGS. 1-3 includes a T-inlet portal 36. The air tube 34 is mounted within the profiled sidewall groove 30 formed within the sidewall 16 proximate the bead region 20 of the sidewall. The groove 30 and the tube 34 assembled therein circumscribes a lower sidewall region. The T-inlet portal 36 includes an inlet connector 38. A filter intake component 40 is further provided that brings air from outside the tire through the tire sidewall 16 to the tire inner liner 26 for a purpose explained below.

Referring to FIGS. 4A, 4B and 4C, at the T-inlet portal 32, the connector 38 is positioned in-line with the air pumping tube 34. The connector 38 has an elongate in-line connector body 44 from which outwardly projecting wing protrusions 46 extend. The in-line body 44 and wing protrusions 46 combine to form a connector of generally T-shape in cross-section. The in-line body 44 of the connector 38 tapers inward from the wing protrusions 46 to an outwardly facing flat surface region 48. A pair of axial chambers 50, 52 reside within the in-line connector body 44 and are connected by a medially located axial passageway 54. Oppositely directed in-line air tube-engaging coupling posts 56, 58 extend from opposite ends of the in-line body 44. The coupling posts 56, 58 have axial passageways 60, 62, respectively, that communicate with respective air chambers 50, 52 within the connector body 44. End regions of the coupling posts 56, 58 are sized to be closely received respectively into opposite ends of the air tube 34 and have a series of annular retention ribs 64 formed to engage the air tube 34 and assist in maintaining the connection between the coupling posts 56, 58 and respective air tube ends.

A tubular inlet conduit 66 having an axial internal air passageway 68 is connected to the connector body 44. Air flowing through the inlet conduit 66 is routed through the air chambers 50, 52 and the tube-engaging coupling posts 56, 58, and enters the air tube 28. An outward end region 70 of the inlet conduit 66 is configured having an axial series of spaced apart annular snap-in ribs 72. Each annular rib 72 has a frustro-conical profile, tapering toward a remote end of the inlet conduit 66 as best seen in FIG. 4C.

Referring to FIGS. 5A, 5B and 5C, an elongate, cylindrical air intake conduit 76 is integrally coupled with a larger diameter filter seating chamber 74. The chamber 74 is defined by a cylindrical filter housing 78. The housing 78 receives a porous cylindrical filter element 80 therein. The elongate tubular intake conduit 76 has a central axial air passageway 86. Annular retention flanges 82, 84 extend the circumference of the housing 78. A remote coupling end 88 of the intake conduit 76 is provided with a series of frustro-conical annular coupling ribs 90, tapering inward toward a remote end of the conduit 76. The passageway 86 communicates with the outer filter chamber 74 in which the porous filter element 80 is seated The outward filter end of the intake conduit 76 is positioned in communication with air outside of the tire and functions to intake air into the pumping system. The intake conduit 76 routes the outside air to the inner liner region of the tire as will be explained. Accordingly, the axial length of the intake conduit 76 is sufficiently long to span from the filter element 80 through the tire sidewall 16, to the tire inner liner 26. A cap component 79 encloses the filter housing 78 to retain the filter element 80 inside.

Figure 6A:
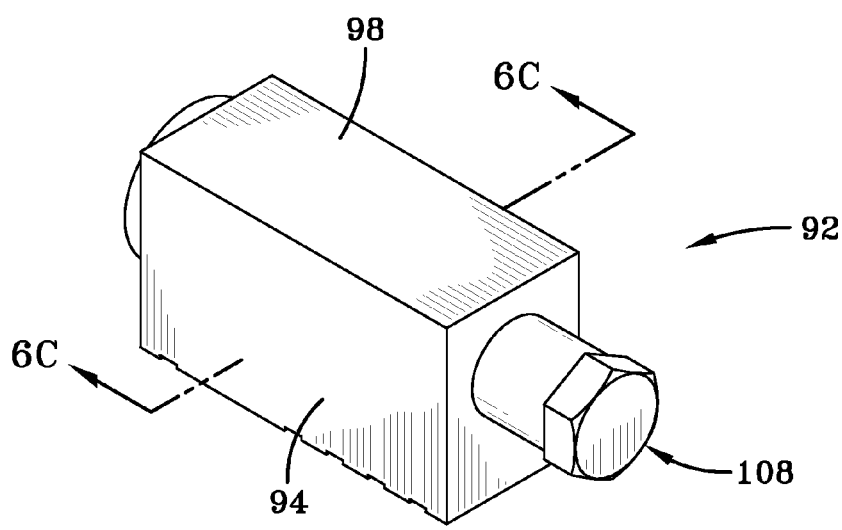
FIG. 6A is a top perspective view of inlet housing.
Figures 6B, 6C:
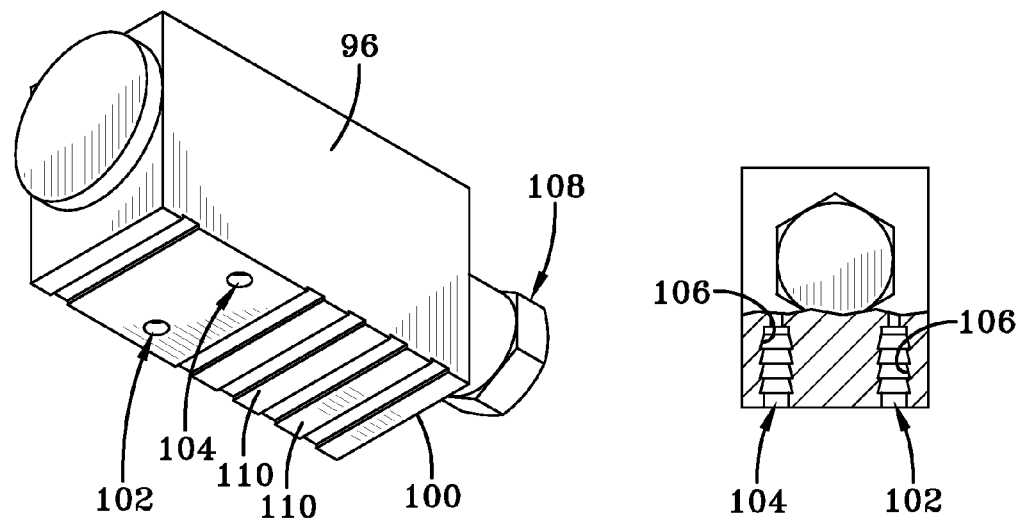
FIG. 6B is a bottom perspective view of inlet housing.
FIG. 6C is a partial section view of connection area from FIG. 6A.

In FIGS. 6A, 6B and 6C, an inlet housing 92 is shown. The housing 92 is of generally a rectangular block configuration having elongate sidewalls 94, 96 and top and bottom walls 98, 100. Other geometries may be employed if desired to configure the housing 92. Extending into the bottom wall 100 are a spaced apart pair of quick-connect inlet sockets 102, 104 integrally formed by the housing 92. The sockets 102, 104 are elongate and of generally cylindrical inward configuration. The sockets 102, 104 create air passageways into an internal inlet housing air chamber (not shown). Positioned along inward lengths of the sockets 102, 104 are a series of annular detents of frustro-conical configuration. An externally accessible pressure setting nut and bolt 108 extends into the housing 92. Along the bottom surface 100 are a series of outwardly projecting ridges 110; the ridges 110 operable to assist in the adherence of an adhesive coating (not shown) that is used to attach the housing 92 to the tire inner liner 26.

As used herein, "inlet housing" is applied as a generic term in its broadest sense as a housing that receives inlet air. The housing 92 takes air from the intake conduit 76 and delivers it into the air pumping tube 34. The pumping tube 34 in turn pressurizes the air with each full or partial tire revolution. While referred to generically as an "inlet housing", the inlet housing 92 is specifically used in the preferred embodiment as a housing which, in addition to receiving inlet air, contains a valving regulator system of controlling air pressure within the tire cavity 28. When air pressure within the tire cavity 28 is at a threshold pressure, the regulator within housing 92 closes to prevent additional pressurized air from entering the tire cavity. When air within the tire cavity 28 is below a threshold level, the regulator within housing 92 opens and pressurized air is admitted into the tire cavity.

A suitable regulator valve system would typically include a pressure measurement mechanism operable to measure tire cavity air pressure. The measured cavity air pressure then is used to open or close the flow of air into the tire cavity 28 from the air tube 34. A representative suitable two-port valve system useful in the subject air maintenance tire system is found in co-pending U.S. patent application Ser. No. 14/041,490, filed Sep. 30, 2013, hereby incorporated herein by reference in its entirety. In the two-port system disclosed, intake air would be conducted through the intake conduit 76 into the inlet housing 92 by way of socket 102. The inlet air within housing 92 is directed into the pumping tube 34 an air flow path through socket 104 and inlet conduit 66 to inlet connector 38. Air is then pressurized peristaltically by the air tube 34. If air is required to bring the tire cavity pressure up to threshold, the pressurized air is directed into the tire cavity. If the measured cavity pressure is at threshold, the pressurized air from the pumping tube 34 is vented.

Figure 8:
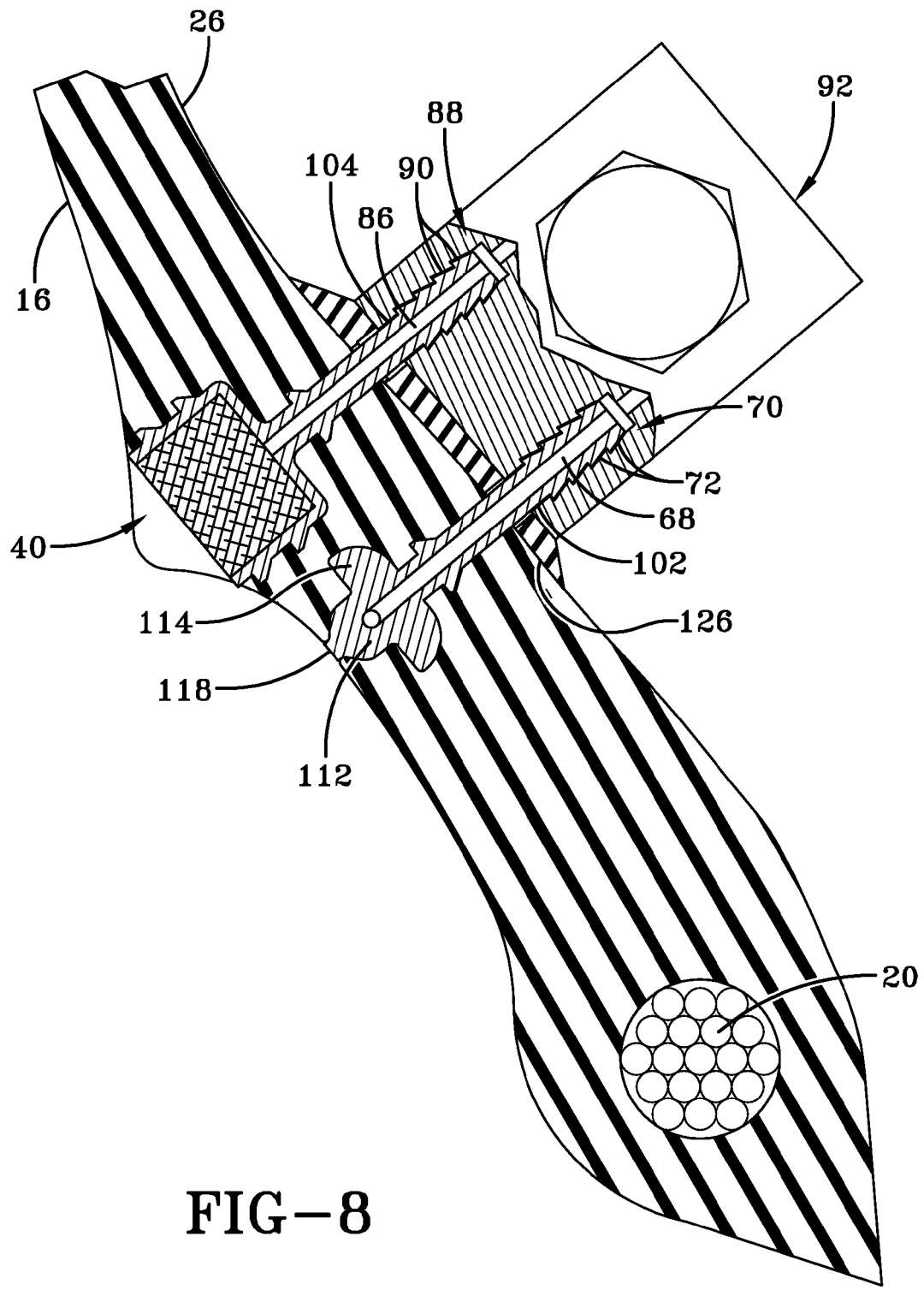
FIG. 8 is a section view of the inlet area.

As best seen from FIGS. 6C and 8, each of the sockets 102, 104 are integrally formed by the housing 92, and have an elongate cylindrical internal configuration. The air passageways through the sockets 102, 104 communicate with an air chamber within the housing 92. The sockets 102, 104 are further formed by the housing 92 to each have a respective series of spaced apart frustro-conical detents 106 formed in cylindrical sidewalls defining each respective socket. The placement, configuration, and dimension of the detents 106 within sockets 104, 102 are intended to facilitate mating snap-in engagement with the intake conduit annular frustro-conical ribs 90 and the inlet conduit frustro-conical annular ribs 72, respectively. The conduits 70, 88 thus snap-in conveniently and quickly into respective sockets of the regulator housing 92. Replacement or repair of the housing or intake or inlet assemblies is thus expedited should such replacement or repair become necessary. The snap-in assembly further allows for the placement of the regulator assembly against the inside of the tire, affixed to the inner liner 26. The conduits 70, 88 have a shaft length sufficient to span the tire sidewall 16, project through the apertures 130. 128, of the mounting bracket 126, and fully snap-in insert into respective sockets 104, 102 of the inlet housing 92.

Figure 7A:
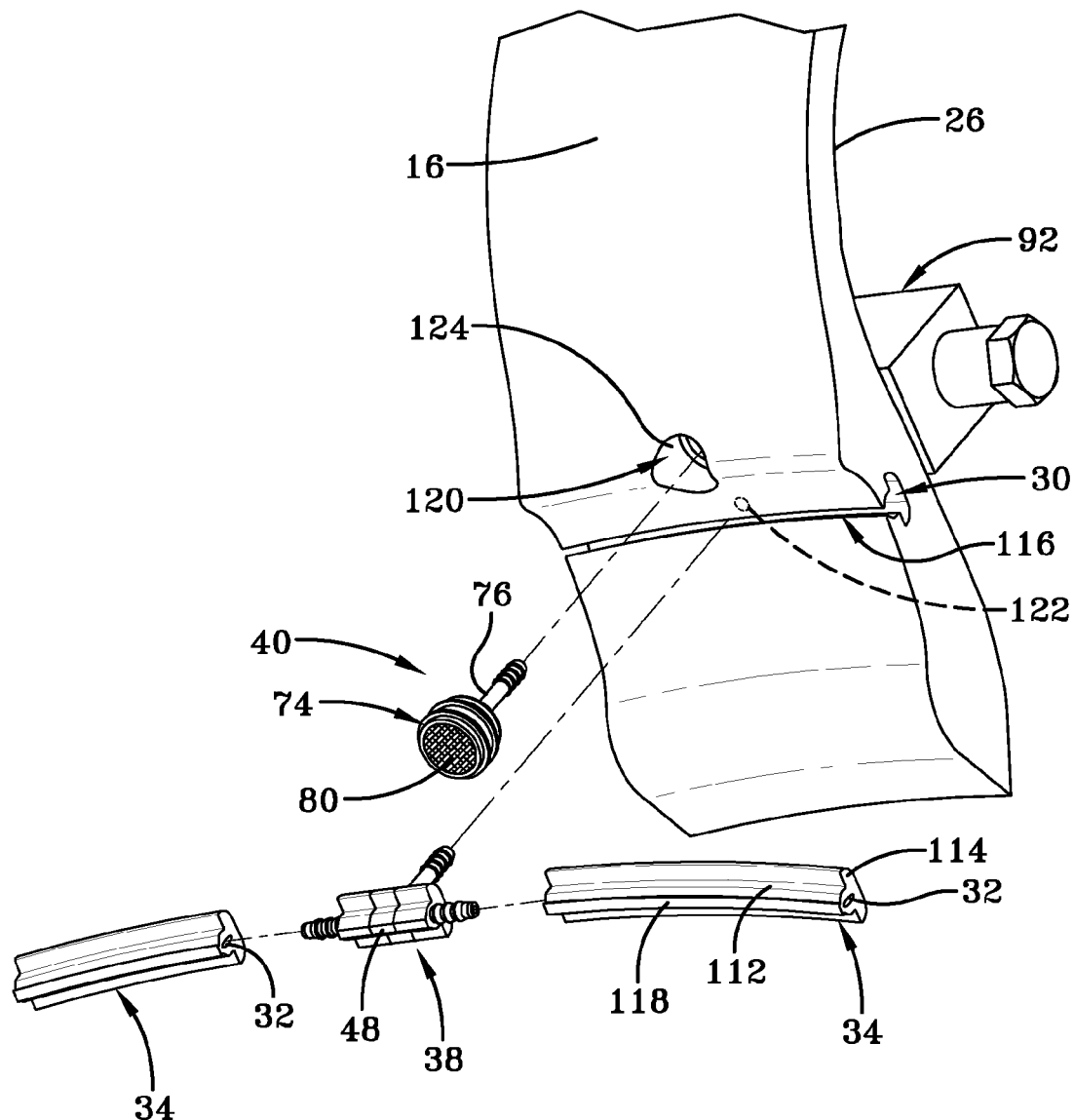
FIG. 7A is an enlarged section view of inlet area showing location of filter, inlet conduit, and air tube.
Figure 7B:
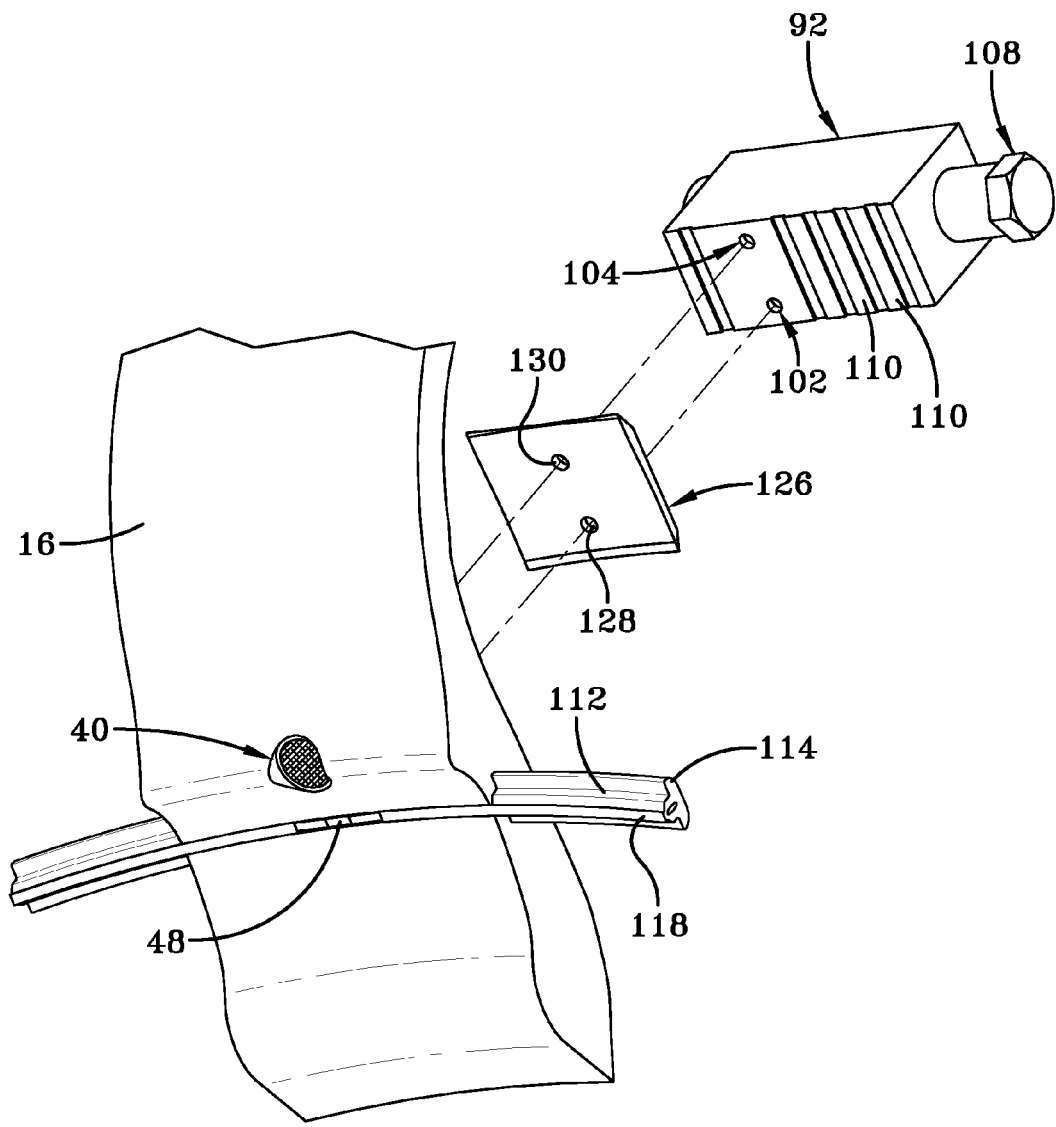
FIG. 7B is an enlarged section view of inlet area showing filter, inlet conduit and air tube in place. The inlet housing and rubber mounting bracket are shown exploded.
Figure 7C:
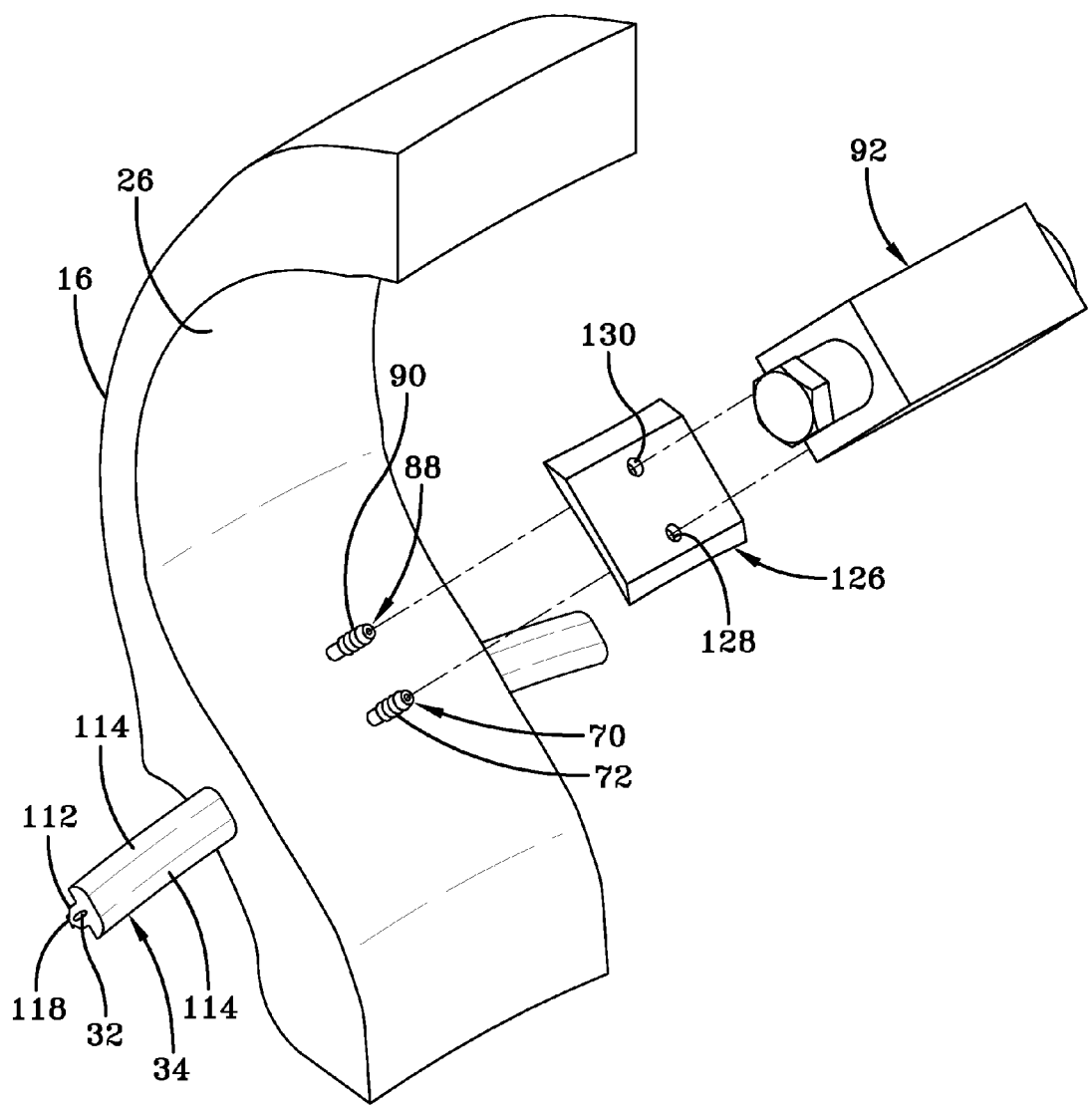
FIG. 7C is an enlarged section view of inlet area showing the inlet housing and rubber mounting bracket in relation to the tire.
Figure 7D:
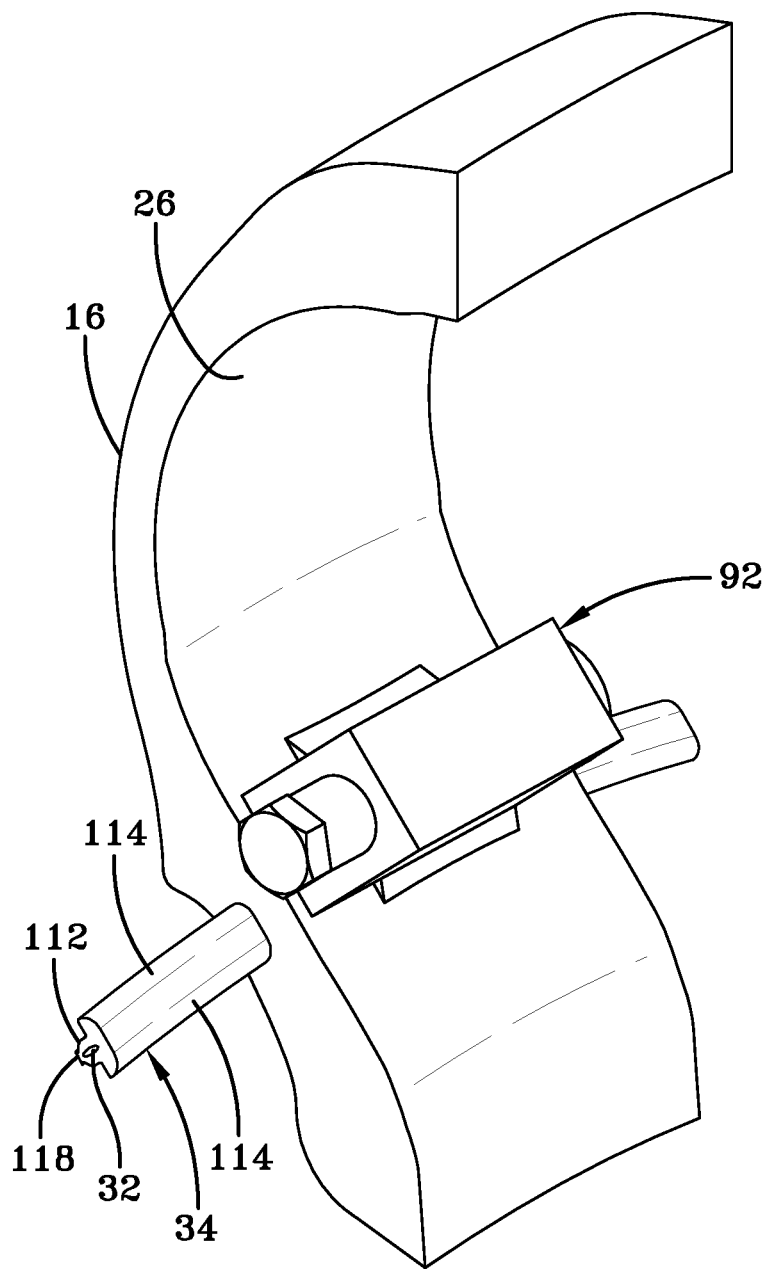
FIG. 7D is an enlarged section view of inlet area showing rubber mounting bracket installed.

Referring to FIGS. 7A through 7C, assembly of the air tube 34 into the groove 30 of tire sidewall 16, and attachment of the inlet housing 92 to the tire inner liner 26 are shown. The air tube 34 and the inlet connector 38 are each elongate and generally mushroom shaped in cross section. The wing projections 114 of the tube 34 and the wing projections 46 from the connector body 42 retain and seat within respective portions formed by the sidewall groove 30. The mushroom configuration is shown in detail in co-pending U.S. patent application Ser. No. 13/470,525, filed May 14, 2012, hereby incorporated herein in its entirety In the subject "mushroom" configuration, the peristaltic tube 34 includes a truncated wedge-shaped outboard tube body 112 defined by outwardly divergent sides extending from a small width dimensioned (D3) flat end surface 118 to an inboard domed wing protrusions 114, each having an upper arcuate surface of radius R1 and an underside flat surface. The wing protrusions 114 are distanced L4 from the end wall and the tube is dimensioned in transverse section L1. The sides of the wedge shaped body 112 outwardly diverge at an angle $\alpha$ and intersect the wing projection underside surface. The cap region of the tube 34 is flat on the inward end. The air passageway 32 is elliptical and located within the tube body 112, having a major longitudinal axis oriented along a cross-sectional centerline of the tube. The length of the elliptical passageway is L2 and its transverse width is D2. D1 designates the tip to tip span of the tube and D3 the diameter of the narrower end of the tube. L3 is the distance within the tube from the end surface to a center of the elliptical passageway 196.

The air tube 184 accordingly has preferred dimensions within the ranges specified below:
D1: 6.39+/−0.1 mm;
D2: 0.7+/−0.01 mm;
D3: 1.44+/−0.05 mm;
L1: 4.25 mm;
L2: 2.2+/−0.1 mm;
L3: 1.78+/−0.01 mm;
L4: 1.83+/−0.05 mm;
$\alpha$: 24 degrees;
R1: 1.85 mm.

The inlet connector 42 is configured complementary with the air tube 34 and shares the complementarily configured groove 30. As such, the inlet connector 38 is generally elongate and generally mushroom shaped in cross section. The wing protrusions 46 of the connector 38 extend from the inline connector body 42. The body 42 and the wing protrusions 46 of the connector 38 reside within the groove 30 and retain and seat the connector 38 within the groove 30. The mushroom configuration is shown in detail in co-pending U.S. patent application Ser. No. 13/470,525. In the "mushroom" configuration, as with tube 34, the inlet connector 38 includes the truncated wedge-shaped outboard in-line body portion 44 defined by outwardly divergent sides extending from a small width dimensioned (D3) flat end surface 48 to the inboard domed wing protrusions 46. Each wing protrusion 46 has an upper arcuate surface of radius R1 and an underside flat surface. The wing protrusions 46 are distanced L4 from the end wall and the tube is dimensioned in transverse section L1. The sides of the wedge shaped connector body portion 44 outwardly diverge at an angle α and intersect the flat underside surfaces of the wing protrusions 46. The cap region defined by wing protrusions 46 is flat on the inward end. The external dimensions of the mushroom shaped connector 38 are as set forth above for the air tube 34 and complement the dimensions and configuration of the groove 30 within the sidewall 16.

With reference to FIGS. 7A through 7D, the air tube 34 and inlet connector 38 mount through a narrow entry slit 116 leading to the groove 30. The air tube 34 and inlet connector 38 are compressed resiliently to gain admittance through the slit 116. Upon entering the groove 30, the air tube 34 and inlet connector 38 flex into their respective common mushroom configurations to fill the profile and geometry of the mushroom shaped groove 30. When fully inserted, the flat surface 48 at the tapered end of the inlet connector body portion 44 and the flat end surface 118 at the tapered outer side of the air tube body 112 are generally coplanar with the outer side of tire side wall 16 and fill the opening created by the slit 116. A throughbore 120 is formed through the sidewall 16 and includes an outer larger diameter filter pocket or chamber 124. The throughbore 120 is configured and dimensioned for close receipt of the filter intake component 40. The intake conduit 76 extends through the throughbore 120 to the tire inner liner 26 side. The filter pocket 124 receives the filter chamber 74 and filter 80.

A second through bore 122 is created through the tire sidewall 16 by conventional post-cure manufacture procedures. The through bore 122 is sized to accept the cylindrical inlet conduit 66 of inlet connector 42. The inlet connector conduit 66 projects through the through bore 122 to the inner liner 26 side of the tire sidewall 16.

As seen in FIGS. 7B, 7C and 8, the intake conduit 88 and the inlet conduit 70 project a sufficient distance into the tire cavity 28 from the tire inner liner 26 to extend through the respective bracket apertures 130, 128. The bracket 126 is formed of elastomeric material such as rubber compound. The intake conduit 88 and the inlet conduit 70 are then inserted into the sockets 104, 102 of the inlet housing 92 to assemble the inlet housing 92 against the bracket 126 and the tire inner liner 26. A suitable adhesive may be applied to fixedly connect the bracket 126 and the housing 92 to the tire inner liner 26. The close insertion of the shafts from the intake conduit 88 and the inlet connector 60 into respective sockets 115, 114 establishes a snap-fit engagement as annular ribs along the ends of such shafts engage annular detents within the sockets 115, 114. An air path is thereby established through the intake conduit 88 and into the inlet housing 92 central air chamber; and from the central air chamber of the inlet housing 92 through the inlet connector 38 into the air tube passageway 32. The regulator valve system within the inlet housing 92 is thus connected to control the flow of air into the air tube 34 and control the flow of pressurized air from the air tube into the tire cavity. Air pressure is thus maintained at a desired level within the tire cavity.

From the above, it will be apparent that the orientation of the mushroom-shaped air tube and the mushroom-shaped inlet connector are in alignment within the mushroom-shaped groove within the tire sidewall 16. The mushroom shaped profile of the air tube and the inlet connector is on a side, with the "cap" or wing protrusion side of the mushroom configuration inward toward the tire cavity. The "stem" of mushroom profile of the air tube and the inlet connector is oriented away from the tire cavity toward the outward surface of the tire sidewall 16. So oriented, the wing protrusions lock the air tube and the inlet connector into the sidewall groove and prevent undesired separation from the tire. The intake conduit and the inlet conduit project through the tire sidewall 16 to the inner liner mounted inlet housing 92. By situating the inlet housing 92 within the tire cavity and against the tire inner liner, minimal structural disruption of the tire sidewall construction is required. The structural integrity of the tire sidewall is therefore not compromised because the volume occupied by the inlet housing 92 is accommodated by the tire cavity volume rather than the interior of the tire sidewall. The quick connection and disconnect achieved by the attachment of the intake and inlet conduits into inlet housing sockets enables the achievement of an efficient assembly protocol while enabling disassembly in the event that repair or replacement of components becomes necessary.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:
1. An air maintenance tire assembly comprising:
a tire having a tire cavity defined by an inner liner, the inner liner bounded by first and second sidewalls extending to a tire tread region;
an air inlet housing affixed to the inner liner;
the first sidewall having an elongate sidewall air passageway therein operatively located to compress segment by segment from an expanded diameter to a substantially reduced diameter responsive to a bending strain introduced into the first sidewall from a rolling tire footprint; whereby forcing air segment by segment along the sidewall air passageway;
an elongate tubular inlet conduit extending between the sidewall air passageway and the inlet housing, the inlet conduit post having an internal air passageway operative to route inlet air from within the inlet housing to the sidewall air passageway;
an air intake conduit extending through the first sidewall to the inner liner, the air intake conduit being coupled to the air inlet housing and operative to route air from outside the tire through the first sidewall and into the air inlet housing;
wherein the inlet conduit and the air intake conduit each engaging into respective first and second elongate sockets formed by the inlet housing, whereby establishing respective air flow communication into the inlet housing; and wherein the inlet conduit and the intake conduit and the first and second sockets, respectively, have mutually engaging latching detent means.

2. The air maintenance tire assembly of claim 1, wherein the inlet conduit extends as a post protrusion from a connector housing having an internal connector housing air chamber, the inlet conduit air passageway conducting air from the inlet housing to the connector housing air chamber.

3. The air maintenance tire assembly of claim 2, wherein the connector housing connects to at least one end of the sidewall air passageway.

4. The air maintenance tire assembly of claim 3, wherein the sidewall air passageway comprises an elongate air tube captured within a groove within the first sidewall and having at least one tube end connected to the connector housing.

5. The air maintenance tire assembly of claim 1, wherein the latching detent means comprises at least one snap-in mating annular rib and annular detent.

6. The air maintenance tire assembly of claim 5, wherein the latching detent means comprises a first and a second plurality of snap-in spaced apart annular ribs formed to project from the inlet conduit and the intake conduit, respectively, and a plurality of mating detents formed within the first and the second sockets of the inlet housing.

7. The air maintenance tire assembly of claim 5, wherein the annular ribs of the latching detent means have a substantially frustro-conical external configuration and operatively actuate by an axial movement of the inlet conduit into the first socket and the intake conduit into the second socket.

8. An air maintenance tire assembly comprising:
a tire having a tire cavity defined by an inner liner, the inner liner bounded by first and second sidewalls extending to a tire tread region;
an air inlet housing affixed to the inner liner;
the first sidewall having an elongate sidewall air passageway therein operatively located to compress segment by segment from an expanded diameter to a substantially reduced diameter responsive to a bending strain introduced into the first sidewall from a rolling tire footprint; whereby forcing air segment by segment along the sidewall air passageway;
an elongate tubular inlet conduit extending between the sidewall air passageway and the inlet housing, the inlet conduit having an internal air passageway operative to route inlet air from within the inlet housing to the sidewall air passageway; the inlet conduit attaching to and detaching from the inlet housing by close axial insertion into and axial withdrawal, respectively, from an elongate first socket formed by the inlet housing;
an air intake conduit extending through the first sidewall to the inner liner, the air intake conduit being coupled to the air inlet housing and operative to route air from outside the tire through the first sidewall and into the inlet housing; the air intake conduit attaching and detaching to the inlet housing by a close insertion into and an axial withdrawal from, respectively, an elongate second socket formed by the inlet housing.

9. The air maintenance tire assembly of claim 8, wherein the intake conduit and the inlet socket have engaging latching detent means operative by close insert into a respective socket formed by the inlet housing.

10. A method of assembling an air maintenance inlet assembly into a tire, comprising:
affixing an air inlet housing to an inner liner of a tire bounding a tire cavity, the inlet housing enclosing pressure regulating means;
locating within a first sidewall of the tire an elongate sidewall air passageway operative to compress the air passageway segment by segment from an expanded diameter to a substantially reduced diameter responsive to a bending strain introduced into the first sidewall from a rolling tire footprint; whereby forcing air segment by segment along the sidewall air passageway;
attaching an intake conduit to the first sidewall, the inlet conduit extending through the first sidewall to the inlet housing;
mating the intake conduit to the inlet housing by close insertion of the intake conduit into an elongate first socket formed by the inlet housing;
attaching an inlet conduit to the inlet housing by close insertion of the inlet conduit into an elongate second socket formed by the inlet housing;
routing outlet air from the inlet housing through the inlet conduit to the sidewall air passageway.

11. The method of claim 10, wherein further comprising engaging releasable first latching means between the intake conduit and the first socket of the inlet housing to secure the intake conduit within the first socket.

12. The method of claim 11, wherein further comprising engaging releasable second latching means between the inlet conduit and the second socket of the inlet housing to secure the inlet conduit within the second socket.

13. The method of claim 12, wherein further comprising configuring the first and the second latching means as snap-in spaced apart annular ribs mating with respective annular detents within the first and the second sockets.

\* \* \* \* \*